Figure 1:
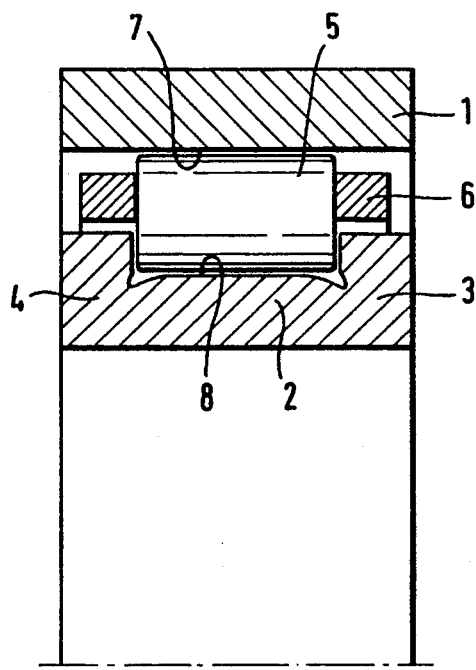

United States Patent [19]
Welter et al.

[11] Patent Number: 5,407,045
[45] Date of Patent: Apr. 18, 1995

[54] LOCKING ELEMENT FREE WHEEL

[75] Inventors: Roland Welter; Joachim Ritter, both of Herzogenaurach, Germany

[73] Assignee: Ina Walzlager Schaeffler KG, Germany

[21] Appl. No.: 273,952

[22] Filed: Jul. 12, 1994

Related U.S. Application Data

[63] Continuation of Ser. No. 22,731, Feb. 24, 1993, abandoned.

[30] Foreign Application Priority Data

Mar. 21, 1992 [DE] Germany .................. 42 09 300.7
Aug. 21, 1992 [DE] Germany .................. 42 27 669.9

[51] Int. Cl.⁶ .................................................. F16D 41/07
[52] U.S. Cl. ...................................... 192/45.1; 192/41 A
[58] Field of Search ......................... 192/45.1, 45, 41 A

[56] References Cited

U.S. PATENT DOCUMENTS

| | | | |
|---|---|---|---|
| 2,307,881 | 1/1943 | Dodge | 192/45.1 X |
| 2,388,424 | 11/1945 | Lund | 192/45.1 |
| 3,022,875 | 2/1962 | Davis | 192/45.1 |
| 3,175,661 | 3/1965 | Maurer et al. | 192/45.1 |
| 3,194,369 | 7/1965 | Witte | 192/45.1 |
| 3,249,186 | 5/1966 | Kluwe | 192/45 |
| 3,380,563 | 4/1968 | Bowers et al. | 192/45.1 X |
| 3,482,667 | 12/1969 | Hein | 192/45.1 X |
| 3,737,015 | 6/1973 | Johnson et al. | 192/45 |
| 4,046,238 | 9/1977 | Mendoza-Orozco | 192/45 |
| 5,000,303 | 3/1991 | Shoji et al. | 192/45.1 |

*Primary Examiner*—Rodney H. Bonck
*Attorney, Agent, or Firm*—Bierman and Muserlian

[57] ABSTRACT

A locking element freewheel comprising an outer race ring (1) and an inner race ring (2) with cylindrical and mutually concentric locking surfaces (7,8) between which tiltably suspended locking elements (5) are guided in a cage (6) wherein the central portion of the locking surfaces (7,8) of the outer race ring (1) or inner race ring (2) has a smaller or larger diameter than the ends thereof. If, due to differing wall thicknesses, the race rings (1,2) have differing rigidity, the edge region of highest rigidity of the locking surfaces (7,8) of the outer race ring (1) and/or inner race ring (2) has a larger or smaller diameter and by such a profiling of the locking surfaces, an overloading at the edges of the locking elements is prevented.

3 Claims, 3 Drawing Sheets

LOCKING ELEMENT FREE WHEEL

This application is a continuation of U.S. patent application Ser. No. 08/022,731 filed Feb. 24, 1993, now abandoned.

A locking element freewheel comprising an outer race ring and an inner race ring with essentially cylindrical and mutually concentric locking surfaces between which tiltably suspended locking elements are guided in a cage is known from DE-PS 12 51 596. Fabrication of the locking elements is done by the necessary processing operations, viz., manufacturing of a profiled bar of drawn material, cutting into lengths for the individual locking elements, hardening of the cut-off locking elements and deburring of the hardened locking elements by vibratory grinding. By reason of the method by which they are manufactured, such locking elements have a kind of cushion shape i.e., a slightly inwardly curved locking surface which, in operation with cylindrical raceways of the inner and outer ring, leads to supporting action at the edges.

Due to the increased compressive stress in the region of the locking surface edges, splintering occurs at these locations and these splintered edges form weak points which promote further damage to the locking elements and can lead to immediate fracture of the locking elements and thus to a functional failure of the freewheel. In the engaged state, edge supporting reduces the attainable operating life of the locking element freewheel and in the idling state, increased friction and wear occur in the edge region.

Attempts have already been made to prevent or limit such overloading in cylindrical roller bearings or locking roller freewheels by rounding or bevelling the edges of the cylindrical or locking rollers while leaving their central portions cylindrical in shape. Due to the high fabrication costs involved, this type of profiling is not used for locking elements of freewheels.

OBJECTS OF THE INVENTION

It is an object of the invention to increase the operating life of locking element freewheels and assure their economical production.

This and other objects and advantages of the invention will become obvious from the following detailed description.

THE INVENTION

The locking element freewheel of the invention comprising an outer race ring (1) and an inner race ring (2) with cylindrical and mutually concentric locking surfaces (7,8) between which tiltably suspended locking elements (5) are guided in a cage (6) is characterized in that the central portion of the locking surfaces (7,8) of the outer race ring (1) and/or inner race ring (2) has a smaller or larger diameter than the ends thereof.

By such a profiling of the locking surfaces, the specific loading of the edges of the locking elements is reduced. Detrimental compression across the edges can be prevented because by virtue of the profiling of the invention, peak stresses in the edge region are reduced.

According to a preferred embodiment of the invention, the locking surface of the inner ring is shaped so that the central portion of the locking surface remains cylindrical while the edge region is given a declining profile, i.e., the central portion of the locking surface has the largest diameter. The reason for this is that, as compared to the outer ring, the inner ring has a smaller outer peripheral surface due to its smaller diameter and is consequently subjected to higher specific loading and is thus clearly more highly endangered in respect of material fatigue than the outer ring. Since, for complying with the required tolerances and achieving a good surface quality, the inner ring has to be ground anyway, the amount of extra work involved for obtaining a defined declining profile in the edge region is very small.

In advantageous developments of the invention, the locking surface of the inner ring is delimited in the axial direction by two shoulders, by a shoulder and a stop disc, or by two stop discs. A further possibility for the axial guidance of the cage and the locking elements relative to the profiled locking surface consists in using a snap cage which is guided in an annular groove of the inner ring. This precise axial guidance of the locking elements or the cage is indispensable for the desired effect of a uniform contact loading between locking element and locking surface.

According to a further embodiment of the invention, the locking element freewheel can be designed so that a shaft serves as the inner race ring. In this case, the locking surface of the shaft is shaped so that the central portion of the shaft remains cylindrical in shape while the edge regions have a declining profile, i.e., the central portion of the shaft has the largest diameter. Such a design of a locking element freewheel permits a particularly short radial construction. Alternatively, the locking surface of a hub, for instance of a toothed wheel, can also be made convex in a similar manner.

In other advantageous developments of the invention, the locking surface of the shaft is delimited in the axial direction by a stop disc and a shoulder of the shaft or by two stop discs. The axial guidance of the locking elements and of the locking element-guided cage on the convex-profiled shaft assures the desired uniform contact loading.

The embodiments of the invention described heretofore are limited to edge stresses under symmetrical Hertzian loading. However, the case often occurs, that the inner ring and/or the outer ring of a locking element freewheel yield differently in the radial direction and are thus subjected to different radial loading. This non-uniform, radially yielding behavior of the race rings is caused by differences in their wall thicknesses or by the supporting action of adjoining material. To obtain a uniform radial loading, i.e., a uniform Hertzian stress across the entire contact region between locking surfaces and locking elements, the edge regions of highest rigidity of the locking surfaces of the outer ring and/or inner ring have a larger or smaller diameter than the remaining portions of the locking surfaces. In this case too, by the one-sided profiling of the locking surfaces it is obtained that the specific high loading at the edges of the locking elements is reduced because they do not come into contact with the corresponding parts of the locking surfaces.

Finally, in a further development of the invention, the locking surfaces of the race rings have a linear, a convex or a logarithmic profile. The optimum shape of the profile of the locking surfaces depending on the type of locking element and the prevailing operational load can be determined by calculation or experimentally by indentation tests with the locking element on a pad of the same material as the raceway and subsequent measurement of the impression.

REFERRING NOW TO THE DRAWINGS

Figure 2:
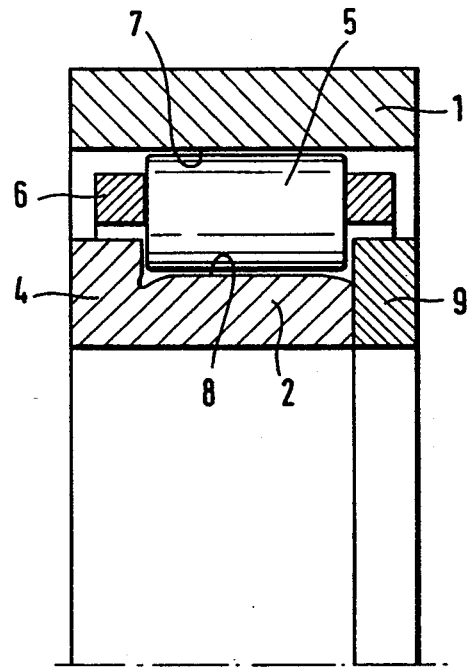
Figure 3:
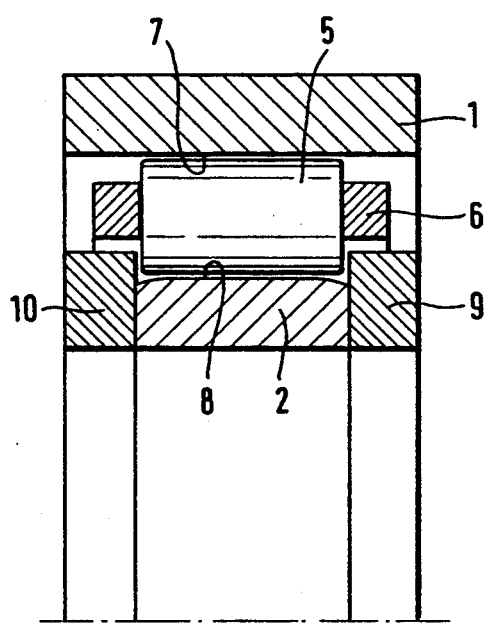
Figure 4:
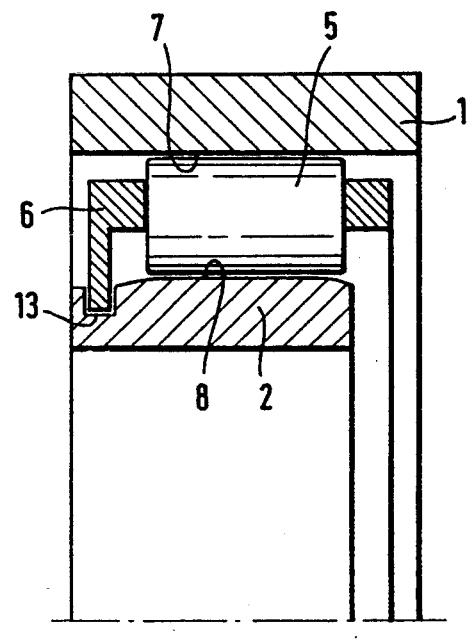
Figure 5:
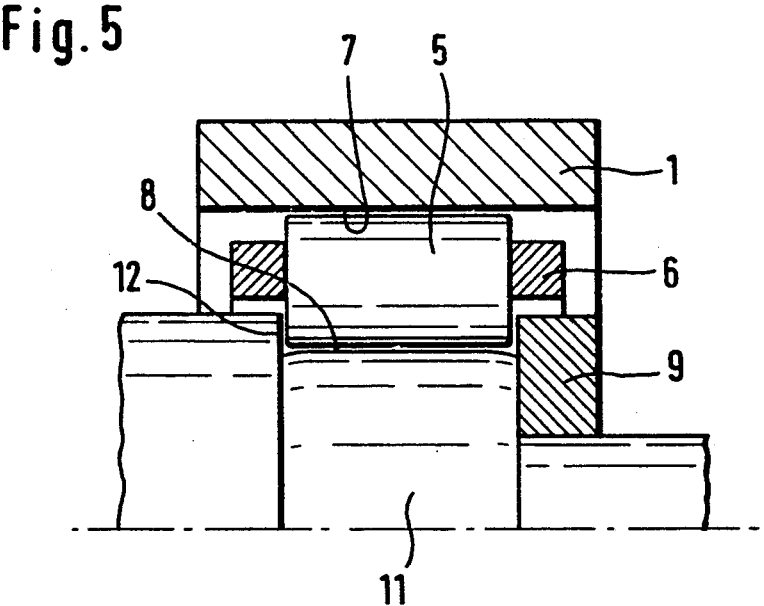
Figure 6:
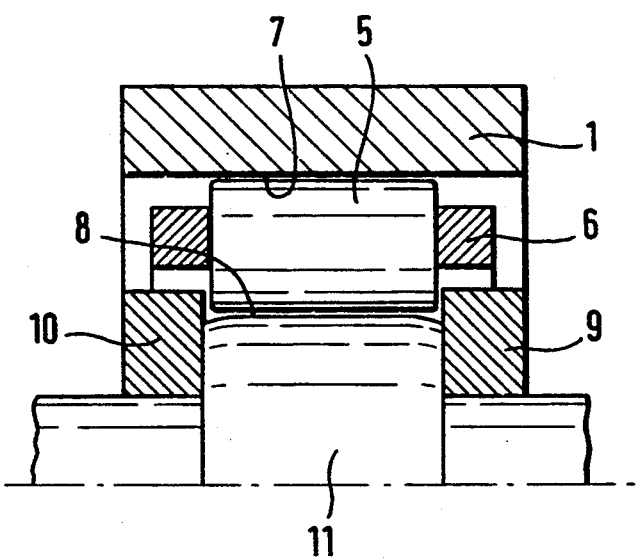
Figure 7:
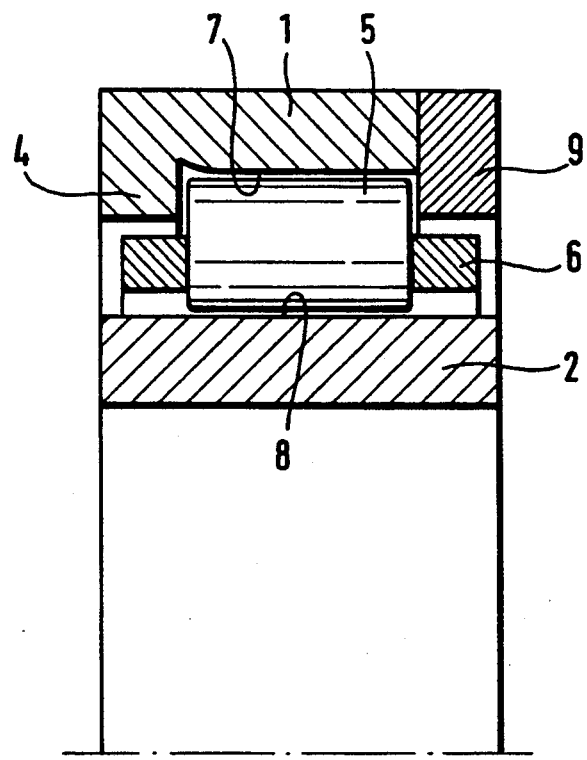
Figure 8:
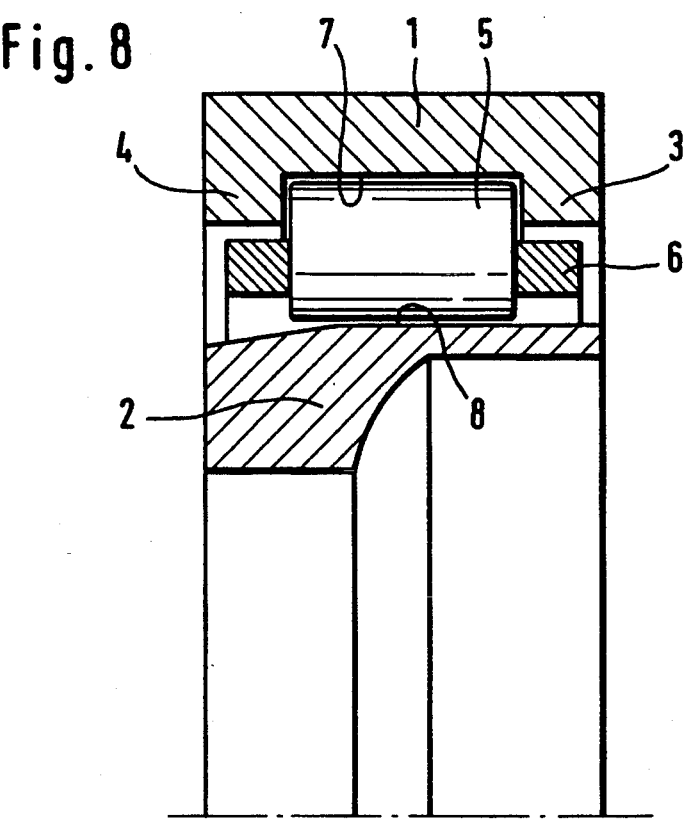

FIG. 1. is a sectional view through a locking element freewheel with axial guidance of the locking elements by two shoulders, FIG. 2 is a sectional view through a locking element freewheel with axial guidance of the locking elements by a shoulder and a stop disc, FIG. 3 is a sectional view through a locking element freewheel with axial guidance of the locking elements by two stop discs, FIG. 4 is a sectional view through a locking element freewheel with axial guidance of the locking elements by a snap cage, FIG. 5 is a sectional view through a locking element freewheel using a shaft as inner raceway, with axial guidance of the locking elements by a step and a stop disc, FIG. 6 is a sectional view through a locking element freewheel using a shaft as inner raceway, with axial guidance of the locking elements by two stop discs, FIG. 7 is a sectional view through a locking element freewheel with one-sided profiling of the locking surface of the outer race ring, and FIG. 8 is a sectional view through a locking element freewheel with one-sided profiling of the locking surface of the inner race ring.

The locking element freewheel of FIG. 1 essentially comprises an outer race ring 1 with a locking surface 7 and an inner race ring 2 with a locking surface 8 and locking elements 5 arranged between the locking surfaces 7 and 8. In the entire region of the width of the locking elements 5, the locking surface 7 of the outer race ring 1 has a cylindrical peripheral surface, i.e. the diameter of the outer race ring 1 is constant across its entire width. The locking surface 8 of the inner race ring 2, in contrast, is made convex in shape so as to have its largest diameter in its central region and a defined declining profile in the region of its edges, i.e, the central portion of the locking surface 8 remains cylindrical in shape. The locking elements 5 therefor roll on one side on the cylindrical locking surface 7 of the outer race ring 1 and on the other side, on the cylindrical central portion of the locking surface 8 of the inner race ring 2.

The guidance of the locking elements 5 is assured by a cage 6. In addition to the described convexity of the locking surface 8, an axial guidance of the locking elements 5 is necessary to obtain the desired uniform contact loading. As can be seen from FIG. 1, the limitation of the lateral movement of the locking elements 5 is effected by shoulders 3, 4 of the inner race ring 2. From this figure, it can also be seen that axial displacement between the locking elements 5 and the outer race ring 1 is possible for compensation of tolerances and differing thermal expansions of the shaft and the housing.

The locking element freewheel of FIGS. 2 and 3 differs from that of FIG. 1 only in respect to the axial limitation of the locking surface 8. While in FIG. 2, the limitation of the locking surface 8 is obtained by a shoulder 4 and a stop disc 9, the limitation of the locking surface 8 of FIG. 3 is effected by the stop discs 9 and 10.

In the locking element freewheel of FIG. 4, the axial guidance required for a uniform contact loading between the locking element 5 and the locking surface 8 is assured by the cage 6 in the form of a snap cage which is guided in an annular groove 13 of the inner race ring 2.

The locking element freewheel of FIGS. 5 and 6 comprises the outer race ring 1 with a cylindrical locking surface 7 and a shaft 11 functioning as an inner race ring with the convex locking surface 8. In this case too, the locking surface 8 is designed so that its central portion remains cylindrical, and in the region extending towards the edges of the locking elements 5, the locking surface 8 has a declining profile. In FIG. 5, the locking surface 8 is arranged offset towards the central axis of the shaft 11 so that the axial movement of the locking element 5 is limited by the step 12 in the shaft 11 and by the stop disc 9.

In FIG. 6, the shaft 11 has an enlarged diameter in the region of the locking element 5 so that the locking surface 8 is raised in the radial direction with respect to the rest of the shaft 11. The axial limitation of the locking surface 8 is effected in this case with the help of the stop discs 9 and 10. The locking element freewheel of FIG. 7 comprises an outer race ring 1 with a shoulder 4. On the opposite side, the play allowed for movement of the locking element 5 is limited in the axial direction by a stop disc 9.

Due to the one-sided connection of the shoulder 4 to the outer bearing ring 1, this latter has a differing rigidity in the axial direction which rigidity is highest in the immediate vicinity of the shoulder 4 and diminishes in the direction of the stop disc 9. This differing rigidity leads to a non-uniform expansion of the outer bearing ring 1 in the radial direction which results in differing Hertzian stress over the cross-section under loading. This stress is highest in the region of the least mechanical deformation of the outer race ring 1, i.e., in the immediate vicinity of the shoulder 4.

The locking surface 7 of the outer race ring 1 therefor has a larger diameter in the edge region having the highest rigidity while, viewed towards the right in the axial direction, the diameter of the locking surface 7 retains a constant value. In this way, a uniform radial load is assured across the entire contact surface between the locking element 5 and the locking surface 7.

In contrast to FIG. 7, the locking element freewheel of FIG. 8 is characterized by the fact that, seen in the axial direction, the inner race ring 2 has a diminished cross-section so that different expansion and thus, different Hertzian stress occurs under loading. This stress is highest in the region of the inner race ring 2 having the largest material cross-section and therefore, the least mechanical deformation. For this reason, the inner race ring 2 is provided at this location with a profile of the invention so that its locking surface 8 is reduced in diameter, while the rest of the locking surface 8 has a constant diameter.

The invention aims at excluding overloading in the edge regions of the race rings 1 and/or 2 by profiling their locking surfaces 7 and/or 8. For manufacturing reasons, it is advantageous to profile the locking surfaces, however, possibilities do exist by reason of eventually improved working procedures for the locking elements, to profile only the locking elements in their edge regions or to profile both the locking surfaces as well as the locking elements in their edge regions. The contact surfaces of the locking elements would then have to be bevelled in the edge region or made convex in the said contact region.

Various modifications of the locking element freewheel may be made without departing from the spirit or scope of the invention and it is to be understood that the invention is intended to be limited only as defined in the appended claims.

What we claim is:

1. A locking element freewheel comprising an outer race ring and an inner race ring with mutually concentric locking surfaces between which tiltably suspended locking elements are guided in a cage, said locking surfaces corresponding in axial extent to the axial extent of the locking elements, characterized in that means for reducing loading at axial end edges of the locking elements is provided, said means comprising a cylindrical, central portion of the locking surfaces of the outer race ring and/or inner race ring which has a smaller or larger diameter, respectively, than the ends of the locking surfaces.

2. A locking element freewheel of claim 1 wherein the cage (6) is guided in an annular groove (13) of the inner race ring (2).

3. A locking element freewheel of claim 1 wherein the locking surfaces (7,8) of the outer race ring (1) and/or inner race ring (2) have a linear, a convex or a logarithmic profile, the optimum shape of the profile of the locking surfaces (7,8) being determined by calculation or experimentally by indentation tests with the locking element (5).

* * * * *